2,915,563
Patented Dec. 1, 1959

2,915,563
ALLYLATION OF AROMATIC COMPOUNDS

Rudolph F. Fischer, Oakland, Calif., assignor to Shell Development Company, New York, N.Y., a corporation of Delaware No Drawing. Application January 7, 1958
Serial No. 707,473

12 Claims. (Cl. 260—624)

This invention relates to the preparation of aromatic compounds having unsaturated substituents, and it more particularly relates to a process for the preparation of allyl-substituted aromatic compounds from allylic compounds and aromatic compounds. The invention more specifically is directed to a new and improved process for the preparation of such compounds employing solid acidic ion-exchangers as catalysts.

Since allyl-substituted aromatic compounds are useful starting materials in organic chemistry, a variety of methods are available for preparing them. The preparation of o-allyl phenol by the Claisen rearrangement of phenol allyl ether is well-known, as is the synthesis of such compounds as alpha-allylnaphthalene by means of the Grignard reaction.

The preparation of allyl aromatic compounds by the addition of the allyl substituent directly to the aromatic has not heretofore been easily accomplished. When allyl alcohol and benzene are refluxed together in the presence of acidic catalysts such as boron trifluoride or anhydrous hydrogen fluoride, the products include small amounts of allyl benzene and larger amounts of 1,2 diphenyl propane. The latter is the sole product realized upon reacting benzene with allyl alcohol in the presence of sulfuric acid. The reaction of xylene with allyl alcohol in the presence of sulfuric acid gives an oil having the composition $C_{19}H_{24}$, whereas the reaction of allyl alcohol with phenol in the presence of acidic catalysts yields polymeric products which on heating depolymerize to such compounds as o-isopropenyl phenol and 3-methyl coumarone.

It is an object of this invention to provide a new and improved process for the direct synthesis of allyl aromatic compounds directly from the aromatic compound and an allyl compound, and without the necessity of preparing such intermediates as are required by the Claisen or Grignard reactions. A further object of this invention is the provision of an allylation process employing solid, durable acidic catalysts which may be readily recovered and reused without special chemical treatment. It is still a further object of this invention to provide a process in which undesirable side reactions resulting from the use of strong miscible acid catalysts are substantially reduced. Other objects of the invention will appear hereinafter.

The foregoing and other objects are accomplished in my process by reacting an aromatic compound having as a substituent an ortho, para-directing group, with an allylic compound having the formula R—O—R', where R is selected from the group of monovalent radicals consisting of the hydrogen atom and acyl, allyl and alkyl-substituted allyl radicals, and R' is selected from the group of monovalent radicals consisting of allyl and alkyl-substituted allyl radicals in contact with an acidic ion exchanger.

The aromatic compounds that are suitable for use with my process may be mononuclear, such as phenol or toluene, or they may be such polynuclear compounds as the naphthols. To be operative with my process, I have found that they must in general have as a substituent a group which activates the aromatic nucleus and renders it more readily substituted than would be the unsubstituted ring. Such substituents are generally saturated or only weakly unsaturated at the point of attachment to the ring, and are generally known as ortho-para activating or directing groups. Examples of these groups include the following radicals —N(CH$_3$), —NH$_2$, —OH, —OCH$_3$, —NHCOCH$_3$, —OCOCH$_3$, —CH$_3$, —C$_6$H$_5$, —CH$_2$COOH, —CH=CHCOOH.

The halogen atoms, which are sometimes included in listings of ortho-para activating groups, are not preferred for use with my process because of their tendency to reduce the activity of the ring although they will be operative as ortho-para activating groups.

Another requirement of the aromatic compounds capable of being allylated with my process is, of course, that they have sites available on the aromatic ring for substitution. In the case of compounds having only one ortho-para directing substituent on the ring or rings, such as phenol or the methylnaphthalenes, all of the other sites are available. I have found, however, that as the number of ring substituents increases, the difficulty of allylation increases as well. An aromatic ring having one, two or three substituents is readily allylated under my reaction conditions, however, as is the ring having four substituents, but a 5-substituent ring, such as monoamino durene, is much more difficult to allylate. I therefore prefer to employ an aromatic reactant substituted ring compound having available two or more nuclear positions.

Examples of the preferred aromatic compounds to be employed with the process of my invention include the alkyl-substituted benzenes such as toluene; the xylenes; the trimethyl benzenes such as mesitylene and pseudocumene; the tetramethyl benzenes durene and isodurene; ethyl benzene; cumene, butyl and isobutyl benzene, and the like. These compounds may generally be described by the structural formula

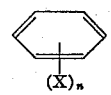

where X is an alkyl radical and $n$ is an integer from 1 to 4.

Other types of suitable aromatic compounds include the hydroxyl-substituted aromatic compounds such as phenol and alkyl substituted phenols; the dihydroxy benzenes, such as hydroquinone and resorcinol; and the trihydroxy benzenes such as pyrogallol and phloroglucinol. The benzene amines, diamines and triamines are also suitable as aromatic reactants, as are phenyl-substituted benzenes such as diphenyl. Similarly the phenyl ethers, including anisole and phenetole, are operative with my invention, as is phenyl acetate. In reciting these substituted mononuclear compounds, I mean also to include their polynuclear analogues, such as the substituted napthalenes, and such multi-substituent compounds as the xylenols, the toluidines, the aminophenols, and the like.

From this discussion of the characteristics of the aromatic compounds operative with my invention and from the examples given, it will be simple for those skilled in the art to delineate the compounds embraced by my process without further extensive testing of such materials.

The allylic reactants for use with my invention are those generally having the formula R—O—R', as described above. These compounds are characterized by including the structure $$\begin{array}{ccc} Z & Z & Z \\ | & | & | \\ C{=}C{-}C{-}O{-} \\ | & | & | \\ Z & Z & Z \end{array}$$

where Z is selected from the monovalent radicals consisting of the hydrogen atoms and the methyl group. Thus, included within the scope of such allylic compounds are those wherein R' is the allyl radical and R is hydrogen, so that the allylic reactant is allyl alcohol. When both R' and R are allyl radicals, the reactant is diallyl ether. Simiarly, when R' is the alkanoyl radical, the compounds duced by the reaction of allyl alcohol and the organic are allyl esters of organic acids, such as may be produced by the reaction of allyl alcohol and the organic acid. Examples of such compounds include allyl formate, allyl acetate, allyl propionate, and the like. Corresponding compounds, when R' is a methallyl radical, are methallyl alcohols, dimethylallyl ethers and dimethallyl esters.

An important feature of my invention is the use in the allylation process of a catalyst comprising a solid acidic ion exchanger. Such catalysts embrace both the inorganic ion exchange materials, e.g. the natural and synthentic aluminosilicate gels, and the organic resinous cation exchangers, such as the carboxylic, phenolic methylene sulfonic and nuclear sulfonic resins. In particular, acidic resinous ion exchange materials having strong acid groups, such as the sulfonic or methylene sulfonic acid groups are preferred. Examples of ion exchangers having these characteristics are shown in the following list.

| Industrial Trade Name | Structure and Active Groups |
|---|---|
| Amberlite IR-120 | cross-linked polystyrene, nuclear sulfonic. |
| Dowex-50 | cross-linked polystyrene nuclear sulfonic. |
| Duolite C-3 | phenolic matrix, methylene sulfonic acid. |
| Nalcite HCR | cross-linked polystyrene, nuclear sulfonic acid |
| Duolite C-25 | cross-linked polystyrene nuclear sulfonic acid. |

Such catalysts are insoluble in the reactant solutions and are stable at temperatures up to around 125° C. The catalysts are useful in concentrations in excess of 1% by weight, based on the aromatic compounds, but I prefer to use them in concentrations of 10%–50% by weight, based on the aromatic compound. Naturally, the most economical concentration of catalyst will depend both on the acid strength of the catalyst and its physical and chemical composition, and on the nature of the reactants with which it is employed.

It is believed that the allylation reaction of my invention takes place in the following manner, exemplified by the reaction between allyl alcohol and toluene:

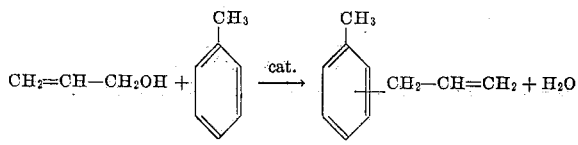

and that the reaction goes in the direction of the allyl toluene as the water of reaction is removed from the reaction medium. As a consequence, the process of my invention is preferably conducted under reaction conditions wherein the water of reaction, or other non-aromatic product, is continuously removed from the reaction mixture, thus displacing the equilibrium in the direction of the allylated aromatic product.

In the case of the reaction shown above, this may be achieved by refluxing the reactants together at atmospheric pressure and continuously removing the water of reaction. The reaction may be conducted at low temperatures and pressures less than atmospheric, or at high temperatures and pressures greater than atmospheric, depending on the nature of the catalyst and of the reactants, so long as one of the products, and most conveniently the non-aromatic product, is continuously removed from the reaction mixture.

In view of the fact that the aromatic reactants characterized above are quite reactive, the reaction can be conducted at temperatures as low as 40° C., for example, when phenol is being allylated. Since the organic acidic ion-exchange resins, which are the preferred catalysts for my invention are unstable above about 125° C., this temperature constitutes an upper range when such resins are employed.

It will be found that by using the solid acidic ion-exchangers as catalysts in the described allylation process, the side reactions experienced when miscible or liquid acid catalysts are employed are minimized or eliminated. For example, the isomerization reaction which strong acids catalyze,

is eliminated entirely when the solid ion-exchange catalysts of my invention are employed. Alkylation reactions which tend to occur at the allylic double bond are materially reduced. Moreover, at the end of reaction there is no need to neutralize the reaction mixture, and thus the uneconomical and time-consuming steps of neutralization and salt removal are eliminated.

The process of my invention may be conducted in a batchwise manner or, since the reactants and products are readily removed from the catalyst, it may be conducted as a continuous operation. In any event, the reaction may be quickly and easily terminated at any point merely by separating the liquid reaction mixture from the solid catalyst. Since the catalysts are not chemically altered by the reaction, once an ion exchanger is rendered in its active form it has a long catalyst life and may be used for repeated reactions before regeneration is required.

Although in general excellent results are obtained with my process when the reactants and resin alone are employed, inert organic dilents can, of course, be used. Such diluents preferably comprise those organic liquids in which the reactants are soluble but the resin is not. Examples of suitable diluents include benzene, the paraffins and particularly those having boiling points around 100° C., and other liquids that will be apparent to those skilled in the art.

The following examples will illustrate the procedures by which the process of my invention may be conducted. It should be understood, however, that these examples are merely illustrative and are not to be regarded as limitations to the appended claims, since the basic teachings therein may be varied as will be understood by those skilled in the art. In the examples, the ingredients are expressed in parts by weight unless otherwise indicated.

EXAMPLE I

*Allylation of toluene with allyl alcohol*

A column of IR-120, a cross-linked polystyrene sulfonic acid resin, was prepared by washing it thoroughly with 10% aqueous sulfuric acid, and then for several days with water. When the effluents were consistently neutral, the resin was dried by azeotropic distillation with benzene.

A 1-liter 3-necked flask, equipped with a dropping funnel, thermometer, stirrer and phase-separating head, was charged with 369 parts of toluene and 40 parts of the prepared resin, and the mixture was heated to reflux with stirring. To this mixture 116 parts of allyl alcohol was added over a period of 3 hours. During this time 18 parts of water were removed from the reaction mixture.

At the end of the three hours, the resin was filtered from the reaction mixture and washed with toluene. It was found that its activity declined only slightly in several such experiments.

The filtrate and toluene washings were charged to a two-foot helices-packed column and distilled. The fractions coming off at atmospheric pressure and below 111° C. were found, upon analysis, to consist mostly of allyl alcohol and toluene, with some allyl ether. Sixty parts of residue remained, and this was cooled, washed twice with aqueous potassium carbonate and twice with water, dried over magnesium sulfate, and filtered. The filtrate was distilled twice through a two-foot helices-packed column and 6.8 parts of a compound having a boiling point at 50°–56° C. (6 mm.) was thus recovered. Upon analysis, this monoallyl toluene was found to have the following characteristics: $n_D20$ 1.5009

INFRA-RED ABSORPTION PEAKS

| C=O | C=C | CH$_2$=CH— | $n_D^{20}$1.5009 [benzene ring with CH$_3$ and R] |
|---|---|---|---|
| 5.7μ, 5.88μ | 6.10μ | 10.6μ, 10.96μ | 13.5μ |

| | C | H | Br$_2$ No., g./100 g. |
|---|---|---|---|
| Calculated for C$_{10}$H$_{12}$ | 90.9 | 9.1 | 121 |
| Found | 86.7 | 9.5 | 125 |

EXAMPLE II

Allylation of toluene with diallyl ether

Using the same equipment, resin and conditions of the prior example, 292 parts of toluene were heated to reflux in contact with 40 parts of the resin. To this mixture 67 parts of diallyl ether was added over a period of 4 hours. At the end of this time 3.5 parts of water had been recovered.

The resin was then separated from the reaction mixture and the mixture distilled to remove the unchanged reactants, leaving 32 parts of residue. Distillation and redistillation of the residue with infra-red examination of the cuts gave a 2.8 part fraction having a boiling point of 68° C. (14 mm.) wherein the C=O absorption was very low and which showed the other IR absorption bands at 6.10, 10.06, 10.96 and 13.5μ characteristic of

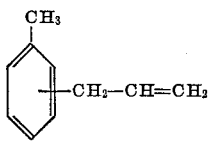

| | C | H |
|---|---|---|
| Calculated for C$_{10}$H$_{12}$ | 90.9 | 9.1 |
| Found | 88.8 | 9.2 |

EXAMPLE III

Allylation of M-Xylene with allyl alcohol

Using the equipment described above, 53 parts of m-xylene was refluxed with 60 parts of a mixture of IR–120 and Dowex 50 resins (cross-linked polystyrene sulfonic acid resins) in their H+ form, prepared as in Example I, together with 400 parts of benzene. The mixture was maintained at reflux with stirring for 21 hours, at the end of which time 11.5 parts of water had been recovered.

The resin was then filtered from the mixture and the reactants and diluent separated from the product by vacuum distillation, leaving 60 parts of product. Upon analysis, a 31% yield of allyl xylenes, based on allyl alcohol consumed, was determined.

EXAMPLE IV

Allylation of phenol

Using the techniques and equipment described in the above examples, phenol was allylated both with allyl alcohol, in one experiment and with diallyl ether in another using 6% of methylene-sulfonic acid resin catalyst units H+ form. In both cases o-allylphenol was prepared, the nature of the product being determined by vapor-phase gas chromatography. The yield of the crude allyl phenol was on the order of 30%, based on the allylic reactant.

EXAMPLE V

Allylation of phenetole

As in the previous examples, phenetole was reacted with allyl alcohol in one experiment and with diallyl ether in another. In both experiments 6% of a sulfonic resin catalyst, based on the allylic compound, was employed.

Using gas vapor-phase chromatographic techniques, the yield of allyl phenetole was determined to be about 30%.

I claim as my invention:

1. A process for the allylation of aromatic compounds, which comprises reacting at a temperature of from about 40° C. to about 125° C. an aromatic compound of the group consisting of alkyl-substituted benzenes, hydroxy-substituted benzenes and alkoxy-substituted benzenes, otherwise unsubstituted by other than alkyl groups, with an allylic compound having the formula R—O—R', where R is selected from the group of monovalent radicals consisting of the hydrogen atom and alkanoyl, allyl and alkyl-substituted allyl radicals and R' is selected from the group of monovalent radicals consisting of allyl and alkyl substituted allyl radicals, in contact with a solid acidic ion exchanger and recovering the allylated aromatic compound from the reaction mixture.

2. The process of claim 1, wherein the allylic compound is allyl alcohol.

3. The process of claim 1, wherein the allylic compound is diallyl ether.

4. The process of claim 1, wherein the solid acidic ion exchanger is an organic resinous sulfonic acid ion exchanger.

5. The process of claim 1, wherein the aromatic compound has the formula

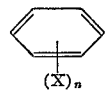

wherein X is an alkyl radical, and n is selected from the integers from 1 to 4.

6. The process of claim 1, wherein the aromatic compound is toluene.

7. The process of claim 1, wherein the aromatic compound is xylene.

8. The process of claim 1, wherein the aromatic compound is phenol.

9. The process for the allylation of aromatic compounds, which comprises reacting together at a temperature of from about 40° C. to about 125° C. an aromatic compound having the formula

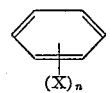

where X is a lower alkyl radical and n is an integer from 1 to 4, with diallyl ether, in contact with a solid strong acidic resinous ion exchanger while removing product water from the reaction mixture, and separating allylated alkyl aromatic product from the reaction mixture.

10. A process for the allylation of aromatic compounds, which comprises reacting together at a temperature of from about 40° C. to about 125° C. an aromatic compound having the formula

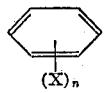

where X is a lower alkyl radical and $n$ is an integer from 1 to 4, with allyl alcohol, in contact with a solid strong acidic resinous ion exchanger while removing product water from the reaction mixture, and separating allylated alkyl aromatic product from the reaction mixture.

11. A process for the allylation of phenolic compounds, which comprises reacting together at a temperature of from about 40° C. to about 125° C. a phenol having at least two nuclear positions available for substitution and otherwise unsubstituted by other than lower alkyl groups, with diallyl ether, in contact with a solid strong acidic resinous ion exchanger while removing product water from the reaction mixture, and separating allylated phenol product from the reaction mixture.

12. A process for the allylation of phenolic compounds, which comprises reacting together at a temperature of from 40° C. to about 125° C. a phenol having at least two nuclear positions available for substitution and otherwise unsubstituted by other than lower alkyl groups, with allyl alcohol, in contact with a solid strong acidic resinous ion exchanger while removing product water from the reaction mixture, and separating allylated phenol product from the reaction mixture.

References Cited in the file of this patent

UNITED STATES PATENTS

| 2,275,312 | Tinker et al. | Mar. 3, 1942 |
| 2,802,884 | D'Alelio | Aug. 13, 1957 |

FOREIGN PATENTS

| 731,270 | Great Britain | June 8, 1955 |

OTHER REFERENCES

Niederl et al.: Jour. Amer. Chem. Soc., vol. 53 (1931), pages 3390–93 (4 pages).

Nazarov et al.: Chem. Abstracts, vol. 39 (1945), col. 916 (1 page).

Tzukervanik: Chem. Abstracts, vol. 40 (1946), col. 5707 (1 page).

"Amberlite Ion Exchange," page 10 (1 page); pub. by Rohm & Haas, Philadelphia, Pa. (September 1953).

Nachod et al.: "Ion Exchange Technology," pp. 272–82 (11 pages); published by Academic Press, Inc., New York (1956).